United States Patent [19]
Stenmark et al.

[11] 3,884,451
[45] May 20, 1975

[54] MIXING APPARATUS AND METHOD

[75] Inventors: Donald G. Stenmark, Houston; Raymond L. Heinrich, Baytown, both of Tex.

[73] Assignee: Exxon Research and Engineering Company, Linden, N.J.

[22] Filed: Jan. 17, 1973

[21] Appl. No.: 324,458

[52] U.S. Cl. .............................. 259/191; 416/176
[51] Int. Cl. .............................................. B29b 1/06
[58] Field of Search ......... 259/191, 192, 193, 9, 10, 259/2, 5, 6, 25, 26, 45, 46, 109, 110; 425/209; 416/176, 77; 415/73, 72

[56] References Cited
UNITED STATES PATENTS

| | | | |
|---|---|---|---|
| 2,200,997 | 5/1940 | Royle | 259/191 |
| 3,219,320 | 11/1965 | Sutter | 259/5 |
| 3,347,528 | 10/1967 | List | 259/2 |
| 3,458,894 | 8/1969 | Wheeler | 259/191 |

*Primary Examiner*—Robert W. Jenkins
*Attorney, Agent, or Firm*—T. B. McCulloch; David A. Roth

[57] ABSTRACT

A single screw extruder, comprising a rotatable core means in an extruder barrel, is provided with spaced-apart discontinuous helical flights arranged on the rotatable core means with each flight centered in the channel formed by the preceding flights, the flights being formed by lands on the core means, and each land having a traversed axial length of about one diameter unit of the core means. The extruder is particularly useful in filler compounding of solid polyolefins, the blending of different polyolefins, and the reacting of monomers with polyolefins such as in extruder grafting.

14 Claims, 11 Drawing Figures

FIG. 10.
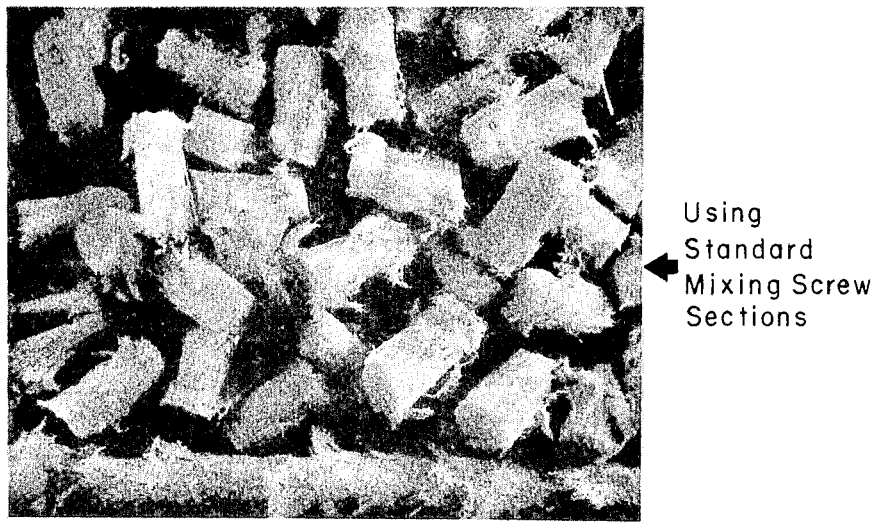
Using Standard Mixing Screw Sections
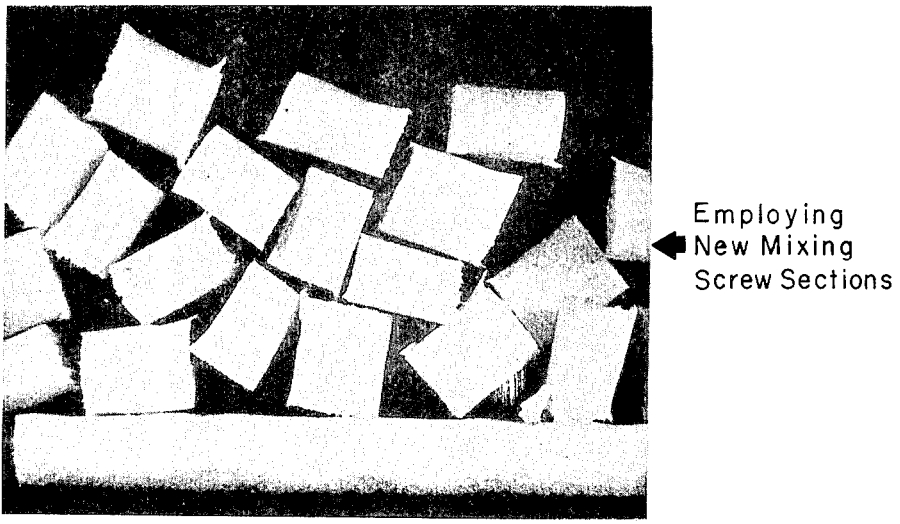
Employing New Mixing Screw Sections
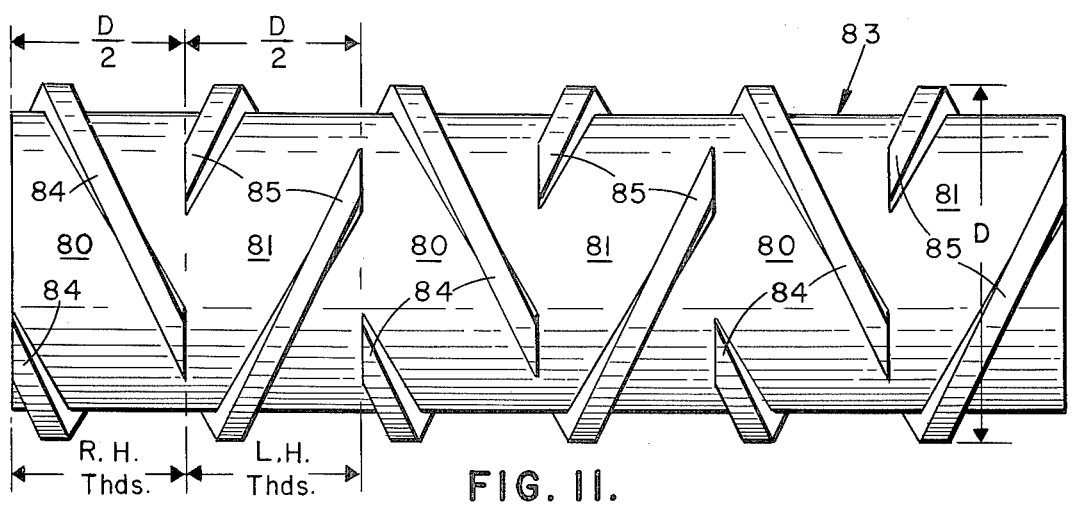
FIG. 11.

//3,884,451//

MIXING APPARATUS AND METHOD

BACKGROUND OF THE INVENTION

1. Field of the Invention

The present invention is directed to an extruder and method for mixing material. More particularly the invention is directed to an improved core means and flight means for an extruder or mixing apparatus. In its more specific aspects, the invention is concerned with flight means on the core of an extruder wherein improved mixing is obtained.

2. Description of the Prior Art

It has long been known that various plastic and other materials such as elastomers and the like may be mixed in an extruder with other materials or extruded into various shapes for further handling. The conventional rotatable screw extruder utilizes pegs, projections, respectively, and the like, such as in U.S. Pat. Nos. 3,487,503 and 2,838,794, to achieve stream splitting and mixing of plastic material. However, such devices expose molten resin to high shear rates for only short times and do not effectively alter the circulation pattern of the melt to effect an increase in mixing efficiency since the streams quickly reunite with the parent stream. Other mixing devices are provided such as described in U.S. Pat. No. 3,520,027 for incorporation of short lengths of filamentary material such as glass fiber in various resins. Here, the mixing is accomplished in a conventional extruder. Mixing apparatus such as described in U.S. Pat. No. 3,051,453 employ a plurality of stationary baffles in which a flowing stream is broken up into a plurality of streams which are remixed. In this device the fluid has to be pumped or forced through the device by extraneous means. An extruder conveying screw comprising a core with discontinuous flights is described in U.S. Pat. No. 3,593,843 but in this patent the flights are lengthy and wide spaces or chambers are provided between two flights which results in blending without any further mixing resulting. A somewhat similar device is described in U.S. Pat. No. 3,368,724 but here again the flights are relatively long and feedback of incompletely masticated material occurs which may result in increased back pressure without compensating advantages. There are many other mixing devices and extruders too numerous to mention here, but none provides or allows the unobvious advantages of the present invention among which are:

1. pumping capacity or
2. relatively low pressure drop;
3. relatively low processing temperatures;
4. exponential stream splitting;
5. independence of stream velocity, viscosity or density; and
6. low shear back mixing where reverse pitched flights are used.

SUMMARY OF THE INVENTION

The invention may be briefly described and summarized as a mixing screw for an extruder for use in an extruder barrel comprised of at least two discontinuous spaced apart helical flights formed by relatively short lands arranged on a rotatable core in the extruder barrel forming elements of repeatable configuration, the lands being centered in the channels between the flights of said elements such that a flowing first stream is formed of material in said barrel by motion imparted to the stream by the extruder or confined zone, the first stream being split into second and third streams which are combined with fourth and fifth streams formed in the same manner by the same or previous element and having the same helical and longitudinal motion as the first stream, which motion results from rotation of the core relative to the barrel and arrangement of lands thereon. The steps are successively repeated to generate a large number of mixed streams, which increases with the number of flights per element and the number of elements per core or barrel length, and recombination occurs thereof to allow recovery of mixed material.

DESCRIPTION OF THE DRAWING

The invention will be further illustrated by reference to the drawing in which:

FIG. 10 shows pellets of glass fiber filled polypropylene obtained with the present invention (FIG. 3) compared with those obtained with a comparable conventional extruder.

FIG. 11 shows six double-flight elements arranged with alternating left- and right-handed flight pitches.

DESCRIPTION OF THE PREFERRED EMBODIMENTS WITH RESPECT TO THE DRAWING

Figures 1, 2:
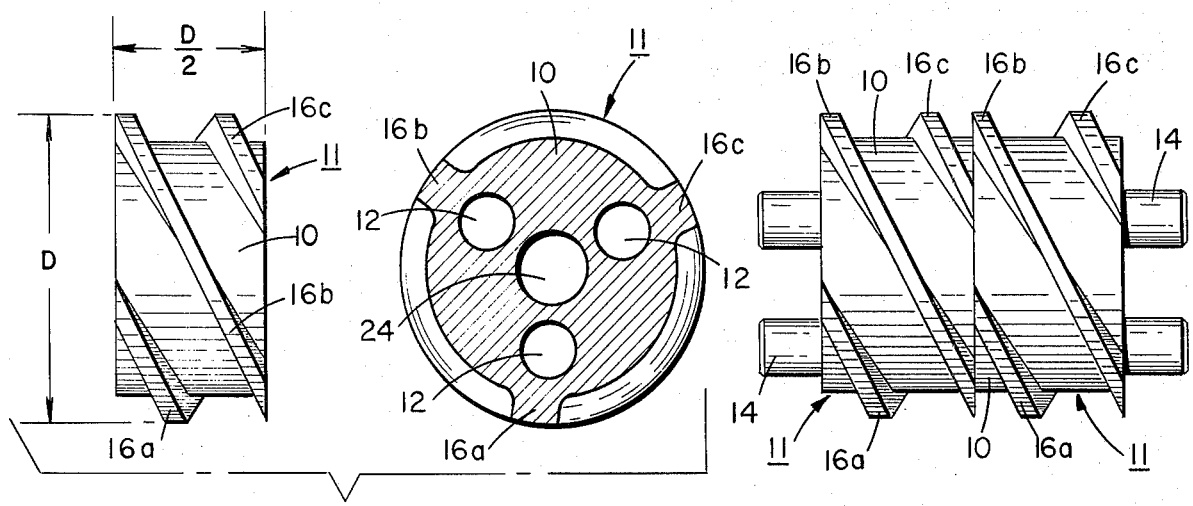
FIG. 1 is a side elevational view and a cross-sectional view showing individual triple-flighted elements used in forming the core of the present invention.
FIG. 2 illustrates two elements of FIG. 1 joined together in accordance with the present invention.

The following table gives dimensions of the several terms used with respect to the drawing:

| | | Dimensions in Terms of Core Diameters | |
|---|---|---|---|
| | | Range | Preferred |
| $w$, | narrowest-width-channel: | 1/20 to 2 | 1/10 to 0.5 |
| $l$, | running length of n.w.c.: | −0.25 to 3 | 1/10 to 1.5 |
| $L_e$, | element length: | 1/10 to 5 | 1/3 to 1 |
| $D$, | diameter of core means: | any | 1″ to 1′ |

Figure 3:
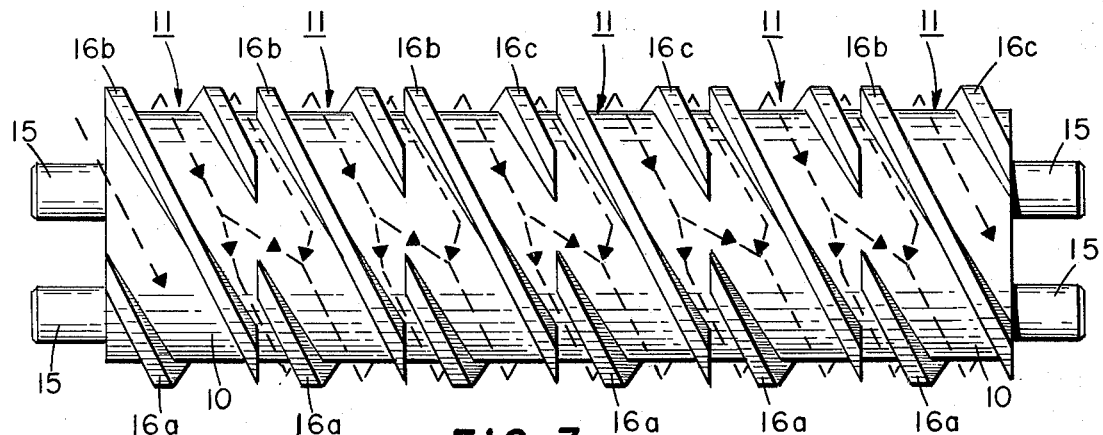
FIG. 3 illustrates six elements of FIG. 1 joined together and shows the stream splitting and joining.

Referring now to the drawing and particularly to FIGS. 1 through 3, in which identical numerals designate identical parts, numeral 11 designates an element of an extruder core 10 having equally spaced apart triple flights 16a, 16b and 16c while the cross-sectional view of element 11 shows three pin holes 12 used to fasten the elements together as shown more clearly in FIG. 2 where two identical elements 11 are pinned together by pins 14 in pin holes 12.

In FIG. 3, six elements 11 (three diameters in overall length) are pinned together by pins 15 in pin holes 12. Also shown in FIG. 3 is the flow of fluid such as molten polyolefin, the separate streams being shown by arrangement of the lands 16a, 16b and 16c forming three flights per element in repetitive fashion.

Of course, the two elements 11 in FIG. 2 and the six elements 11 inclusive of FIG. 3 are arranged in a suitable barrel not shown of an extruder having at least an inlet and an outlet. Also reverting to FIG. 1 and not shown in FIG. 2 or 3, hole 24 is provided for rotation by coaxial means not shown of the pinned sections in the extruder barrel by external power means.

With respect to FIGS. 1 to 3, it will be clear that the rotatable core is made up of interconnected successive elements having leading and trailing ends and that there are at least two flights on each element made up of lands. The trailing ends of the flights of the second element is transversely displaced in the same direction on the core from the leading ends of the flights of the first element so that the trailing end of each flight (land) of the second element is between the projected helical axes extending from the leading ends of the flight of the first element.

Figure 4:
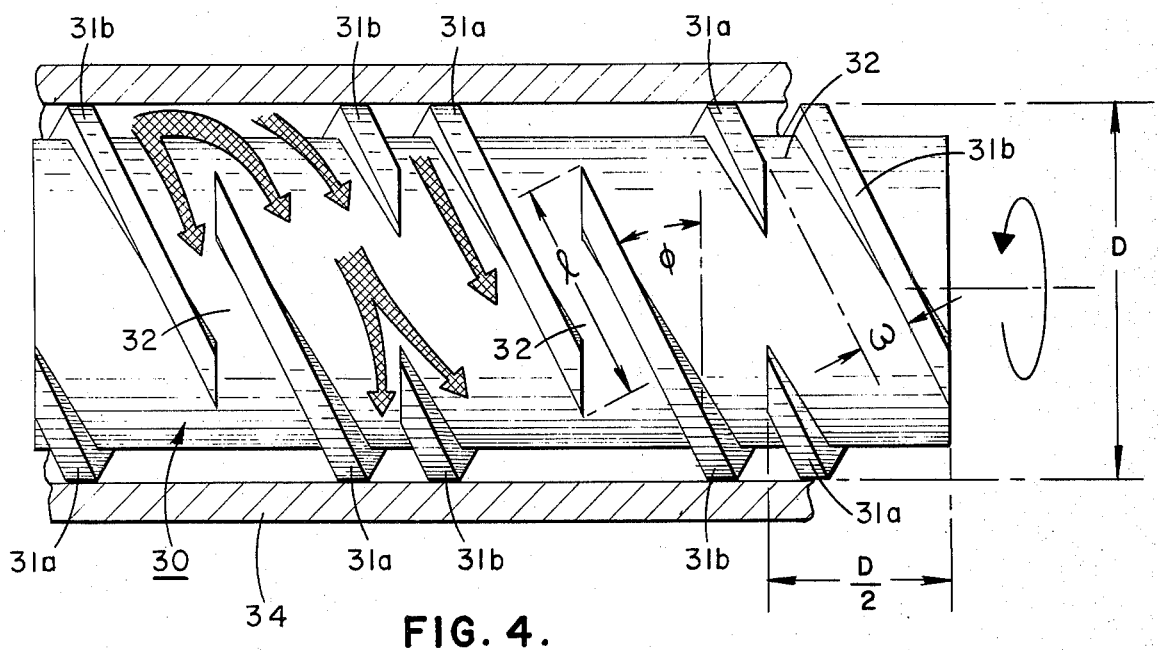
FIG. 4 shows a double-flighted core in an extruder barrel.

In FIG. 4, a double flighted core 30 has lands 31a and 31b making up the flights in each repeating element. As seen clearly in this figure, channels of the type 32 are formed between the lands 31a and 31b being of perpendicular width $w$ while the length between the ends of one land and another is $l$. The width $w$ is designated as the width of the narrowest- width-channel (n.w.c.) and is defined as the smallest perpendicular distance between two adjacent lands. The width $w$ may range between about 1/20 to about two diameters of the core means, depending on the number, thickness, and pitch of the flights. Length ($l$) of the n.w.c. formed by two discontinuous flights is defined as the running length from left to right along the helical flight axis, specifically from about −0.25 to about three diameters of the core means in length, in which the diameter of the core means includes the lands but length $l$ may be longer depending upon the length of each element and the incorporation of additional overlap between lands 31a and 31b. The negative value would only obtain when there is no overlap of the lands. The total length of the flights (lands) depends on the diameter of the barrel and the diameter of the core means, both of which by way of example may typically range from about 1 inch to about 1 foot but are not limited by this range and can include any diameter outside these limits insofar as fabrication methods permit the construction thereof, as well as the pitch of the lands which may be at any helix angle $\phi$ from greater than about 3° to less than about 90°, the helix angle being formed between the helical flight axis and a plane normal to the longitudinal axis of the core means. Typically, the axial length of the flights may range from 1/10 to five diameters of the core means. A suitable helix angle may be from about 3° to about 60°, usually about 18°.

The core 30 is arranged in extruder barrel 34 which is provided with at least an inlet and an outlet means not shown with means also not shown provided to rotate the core 30 relative to the barrel 34 or the barrel 34 relative to the core 30 to provide a helical and longitudinal motion to material introduced into the barrel 34 such as by a hopper (inlet) not shown on the left end, the means to rotate the core means for example also being on the left end of the barrel 30.

In FIG. 4, the pitch of each flight (land) 31a (or 31b) is about one diameter of the core means 30, which is the same pitch as the flights in FIGS. 1 and 3, the pitch being defined as the length traversed along the longitudinal axis of the core means for one complete turn of the flight or its projection along the helical axis. Alternately, the pitch may be defined in terms of the helix angle $\phi$ in which case a pitch of one diameter length (1 L/D) corresponds to $\phi \approx \sin^{-1}(1/\pi) \approx 18°$. The axial length of each repeating element in FIG. 4 is the same as the relative axial length of the individual elements in FIGS. 1 to 3, which is one-half the diameter of the core means 30, the axial length of each element being the approximate flight length measured along the longitudinal axis of the core means 30 between the leading edge and trailing edge of the same flight.

Figure 5:
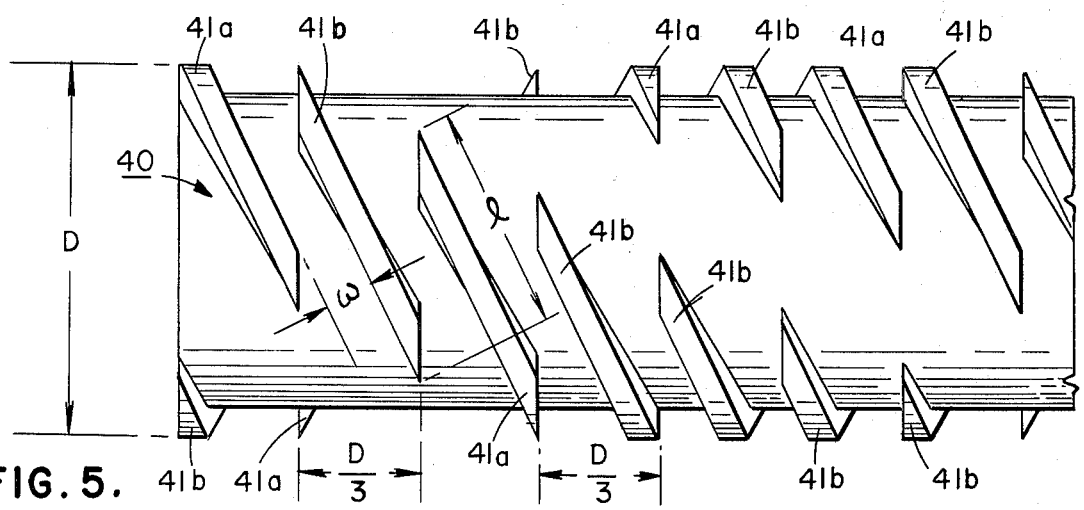
FIG. 5 is similar to FIG. 4 with the exception that the lengths of the flights are shorter.

Referring to FIG. 5, the pitch of the double flights 41a and 41b on each element is the same as in FIG. 4, but the length of each element is one-third the diameter of the core means 40.

Figure 6:
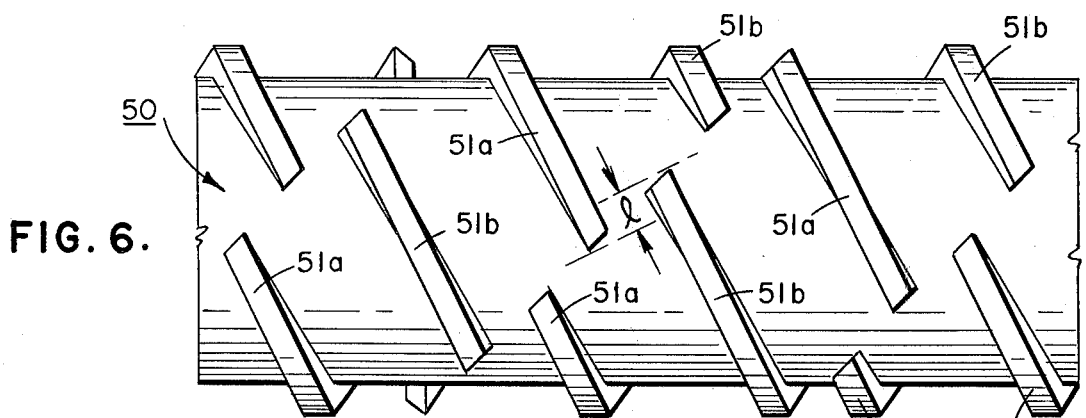
FIG. 6 has flights which are the same length as in FIG. 5 but are arranged in a repeating pattern different than in FIG. 5 so as to decrease the land length of the narrowest-width-channel in order to reduce the flow restriction.

The same holds true in FIG. 6 where the core means 50 is provided with equally spaced apart double flights comprised of identical, repeatable lands 51a and 51b having a pitch and length the same as in FIG. 5, except the pattern arrangement of flights in FIG. 6 is different in that the leading (trailing) ends of the equally spaced apart double flights 51a and the trailing (leading) ends of the equally spaced double flights 51b lie on a helical locus line of opposite pitch as the flights (lands), whereas in FIG. 5 the leading (trailing) ends of the equally spaced double flights 41a and the trailing (leading) ends of the equally spaced double flights 41b lie on a locus line which is the circumference of a circle formed by the cross-section of a plane perpendicular to the longitudinal axis of the core means 40. The advantage of the flight pattern of the type shown in FIG. 6 compared to the type shown in FIG. 5 is that the length ($l$) of the narrowest-width-channel (n.w.c.), $w$ being the same in both figures, is shorter. The shorter length $l$ reduces the restriction to flow of materials within the channels of width $w$ between the lands.

Figure 7:
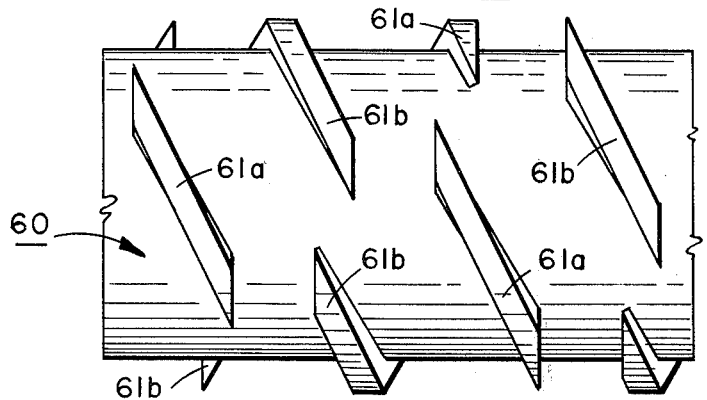
FIG. 7 is similar to FIG. 6 except the land ends are trimmed to further reduce the restriction to flow.

In FIG. 7 the pitch of the equally spaced double flights (lands) 61a and 61b and the element lengths and the pattern of the flights are the same as in FIG. 6, the only difference between the figures is that the ends of the lands in FIG. 7 are trimmed forming sharper corners similar to the ends of the lands in FIGS. 1 through 5, whereas those of FIG. 6 are more blunt. The trimmed (sharp) land-ends further reduce the flow restriction of plastic material within the channels of width $w$ between the lands.

Figure 8:
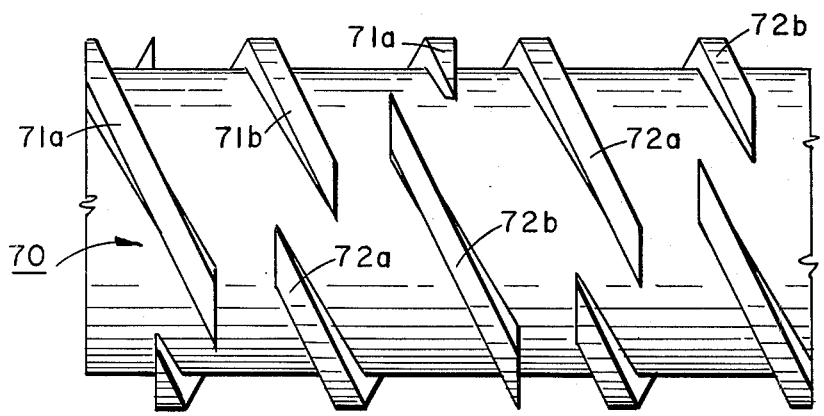
FIG. 8 is another showing similar to FIGS. 6 and 7 illustrating trimmed (sharp) land ends with a slight overlap.

FIG. 8 is the same as FIG. 7 except the core means 70 is provided with flights having land-ends which overlap the opposite pitched helical locus. This overlapping corrects for any over-reduction in the land length ($l$) of the narrowest-width-channel and allows the plastic material within the channels between the flights, such as the channel between flights 71a and 71b, for example, to be more equally divided by the flights 72a and 72b.

Figure 9:
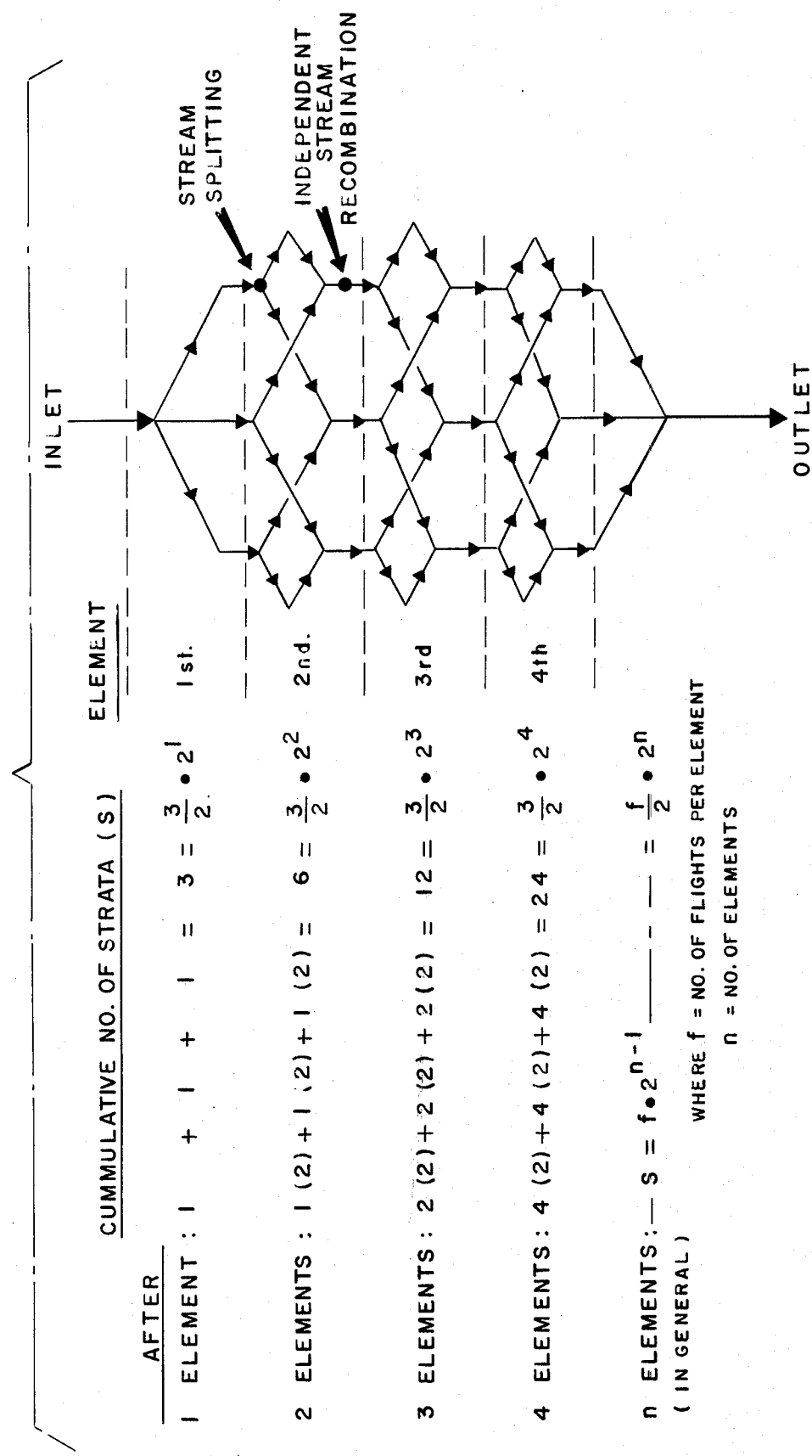
FIG. 9 shows the mixing and recombination obtained with an extruder core means made up of four triple-flighted elements of FIG. 1.

To illustrate the invention further, reference is made to FIG. 9 where stream-splitting mixing is shown schematically for four elements 11 of FIG. 1 where the cumulative number of strata (S) formed in mixing a thermoplastic resin, such as solid polypropylene, increases exponentially ($2^n$) with the number of elements ($n$) and increases linearly ($f/2$) with the number of flights ($f$) per element.

FIG. 10 compares ¼ inch polyolefin (polypropylene) pellets filled with 25% by weight glass fiber having a diameter of about 13 microns and an original length of 1.4 inches which was compounded in a conventional 24/1 L/D extruder. FIG. 10a shows the pellets formed in a conventional extruder without the present invention while FIG. 10b shows pellets formed using the core means of FIG. 3.

In FIG. 11, alternate left- and right-handed double-flighted elements 80 and 81, respectively, make up a core 83 of an extruder, the barrel and other appurtenances of which are not shown. Left-hand elements 80 are provided with flights 84 while right-hand elements 81 are provided with flights 85. The discontinuous flights 84 and 85, respectively, consist of lands similar to those of the other figures of the drawing. The alternate left- and right-handed flights are of equal length and suitably are ½ D of the core 83, but this is not limiting and the left-handed flights may be shorter or longer than the right-handed flights.

The device of FIG. 11 may be suitably fabricated in accordance with Method A (which follows), where a continuous double-flighted left-handed screw and a continuous double-flighted right-handed screw would be cut into ½ D length sections and then fastened together in an alternating left- and right-handed fashion such that the flights are discontinuous with the flights of the succeeding elements centered in the channels formed by the flights of the preceding elements. The pressure drop of the reverse (left)-handed flights may be somewhat alleviated by constructing these shorter in length than the right-handed elements.

The mixing elements of the type shown in FIGS. 1 to 3 may be constructed according to Method A as follows:

METHOD A

1. Construct one long, triple-flighted (triple-channeled), square-pitched, right-handed screw section of 2 inches outside diameter from 17-4 PH stainless steel alloy (17% Cr. 4% Cu, precipitation hardened); heat treated after machining to fulfill strength and hardness requirements met by 4140 or 4340 steels, the flights being parallel and equally spaced apart continuous helixes; about 14 inches total length or long enough to be cut into 12, 1 inch long pieces (element length = ½ L/D).

2. After cutting into 12, 1 inch sections, fabricate triple pin-and-hole arrangement as follows:
   a. Using identical hole dimensions, drill parallel to the longitudinal core axis three equally spaced holes all the way through on one piece (element).
   b. Using the same alignment of the holes and the same relative position of the holes and the flights, drill holes all the way through the remaining eleven pieces such that each piece (element) is identical.
   c. Fabricate connecting pins in sets of three of various lengths of high strength hardened drill rod of slightly less diameter than the pin holes to just fit freely. The pins are of sufficient length so that when the elements are pinned together they protrude about ½ inch on each end of the joined elements such that the joined elements may be fastened to the matched ends of a conventional extruder screw. For example, 7 inch pins would be used to join six 1 inch elements together.
   d. The elements are then connected together by means of the pins such that the flights of the successive elements are not continuous but rather are discontinuous and centered in the channel of the previous element.

Alternately, the mixing elements of the type shown in FIGS. 1 to 3 may be constructed from a single piece of stock without dividing, or cutting, into individual sections which have to be fastened together again. This procedure, referred to as Method B, is described as follows for the construction of the double-flighted mixing screw of the type shown in FIG. 4:

METHOD B

1. Construct one long quadruple-flighted (quadruple-channeled), square-pitched, right-handed screw section of 6 inch outside diameter, the flights being parallel and equally spaced apart continuous helixes. For a total mixer length of 3 L/D comprised of six ½ L/D elements the total axial length is 18 inches.

2. Starting at one end (L/D=0), scribe a mark on each flight every 3 inches (or every ½ L/D) of axial length of the core means. This may be accomplished by placing a scribe, or marker, at the prescribed distance and rotating the core about its longitudinal axis.

3. Starting at one end, cut away every other portion of flight between the scribed marks in discontinuous fashion such that half of the original flights remain, the remaining portions being discontinuosly double-flighted (double-channeled) and equally spaced apart having individual axial lengths of 3 inches (or ½ L/D) between the leading and trailing ends of each flight being centered in the channel formed by the preceding two flights.

The mixing screw shown in FIG. 5 may be constructed by either Method A or Method B.

The mixing screws of the type shown in FIGS. 6, 7 and 8 are best constructed by a method similar to Method B. This procedure, referred to as Method C, is described as follows for the construction of the type of mixing screw shown in FIG. 6:

METHOD C

1. Construct one long quadruple-flighted (quadruple-channeled), square-pitched, right-handed screw section of 12 inch outside diameter, the flights being parallel and equally spaced apart continuous helixes. For a total mixer length of 3 L/D comprised of nine ⅓ L/D elements the total axial length is 36 inches.

2. Starting at one end, scribe a mark on each flight, the scribed mark following an equally spaced apart, left-handed, oppositely pitched, double helical loci (opposite direction as the flights) of pitch 2 L/D.

3. Starting at one end, cut away every other portion of flight between the scribed marks in a discontinuous fashion such that half of the original flights remain, the remaining portions being double-flighted (double-channeled) and equally spaced apart having individual axial lengths of 4 inches (or ⅓ L/D) between the leading and trailing ends of each flight and each flight being centered in the channel formed by the preceding two flights.

The present invention may be employed on thermoplastics in general including, but not limited to, polyolefins such as normally solid polymers of alpha monoolefins having 2 to 8 carbon atoms in the molecule as exemplified, but not limited to, polyethylene and polypropylene, the latter two being preferred. Polyisobutylene of molecular weight from 60,000 to about 400,000, although not limited to such molecular weights, ethylene-propylene rubber, copolymers of the alpha monoolefins mentioned before, blends, both binary and ternary of rubbery material and polyolefins or polyisobutylene, may also be employed or mixed in the present invention together or with fillers such as asbestos, synthetic or natural fibers, glass fibers, clays, dyes, pigments, and the like. Other thermoplastics to which the present invention is applicable are the polyamides, polyacrylics, polyesters, polyphenylenes, polycarbonates, thermoplastic polyureas, polystyrene, and copolymers thereof, polycaproamides, and the like.

Paints may also be blended and/or mixed in accordance with the present invention, particularly the latex paints, either synthetic or natural, paints comprising silicates, organic or inorganic, and other components such as pigments, fillers, solvents, and the like. In the case of paints, pigments include zinc, aluminum dust or flakes, titanium dioxide, iron oxide, and the like. Inhibitors may be added to rubbery or thermoplastic materials, and the like, in accordance with the present invention. These may be oxidation inhibitors, UV inhibitors, and the like.

In practicing the present invention where two or more ingredients are mixed or blended, they may be added separately or together to the extrusion device. Where added separately, more than one inlet is required.

In order to demonstrate the invention further, the following run was performed in a 24/1 L/D extruder using 10 triple-flighted mixing elements of the type shown in FIGS. 1 through 3 (½ D each, total mixing length of 5D) in which the mixer was positioned between 9D and 14D along the screw core axis (zero-D being the position of the feed hopper). The feed was polypropylene powder of Melt Flow Rate ≈ 0.4 (measure of melt viscosity; an increase in the Melt Flow Rate means a decrease in viscosity). Into a mixing zone at a location of 10D was injected by means of an external pump a liquid monomer (acrylic acid) containing a small amount (~ 1.5 weight percent) of an organic peroxide initiator [α, α'-bis(t-butylperoxy)] diisopropylbenzene. The injection concentration of monomer was ~ 5.7 weight percent based on polypropylene. The mixing screws were effective in performing two functions required in the extruder-reaction systems. First, they provided a "melt-seal" among the screw (between 9D and 10D) just ahead of the injection location (10D) due to the channels being filled as a result of the limited back-mixing created by the stream divisions. [Channels formed by continuous flights are normally not completely filled with molten polymer, thus forming a continuous helical "air-space" by which flashed monomer can excape out of the hopper and result in reduced conversions]. Second, the mixer, as an efficient mixing device, apparently generated new polymer surface as the reaction proceeded as well as provided a "homogeneous" blend of reacted (grafted) polymer and homopolymer which constituted the final product. In this particular experiment ~ 5.0 weight percent of reacted monomer was found in the product, or ~ 85–90% conversion. The MFR of the product was ≈ 11.0 (i.e., lower melt viscosity than the feed) indicating that the secondary reaction of "controlled degradation" by peroxide initiators had proceeded sufficiently.

The mixed product may be recovered as a film, sheet, cylinder, which may be cut up into pellets by a suitable device, liquid, or even as dry particulate matter when only such material is used, blended or mixed.

It will be seen that the present invention allows the obtaining of new, useful and unobvious results.

The nature and objects of the present invention having been completely described and illustrated and the best mode and embodiment contemplated set forth, what I wish to claim as new and useful and secure by Letters Patent is:

1. A rotatable core means adapted and constructed to be utilized in an extruder barrel means comprising in combination:
   a. an extruder screw means having a succession of individual spaced apart, offset, discontinuous, helical flights disposed on said screw means to form channels between said flights;
   b. each successive flight being centered in a channel of preceding flights;
   c. said flights having the narrowest-width-channel within the range from about −0.25 to about three diameters of said core means, the diameter of said core means including said flights.

2. A core means in accordance with claim 1 which is formed by at least two interconnected abutting sections.

3. A core means in accordance with claim 1 in which the lands on the core means have a total axial length within the range of about 1/10 to about five diameters of the core means, the diameter of the core means including the flights.

4. A core means in accordance with claim 1 in which the perpendicular width of the narrowest-width-channel is within the range from about 1/20 to about two diameters of the core means, the diameter of the core means including the flights.

5. A core means in accordance with claim 1 in which:
   1. the core means is formed by at least two interconnected abutting sections;
   2. the flights are formed by flights having a total axial length within the range from about 1/10 to about five diameters of the core means;
   3. the width of the narrowest-width-channel is within the range from about 1/20 to about two diameters of the core means.

6. An extruder which comprises:
   barrel means;
   core means arranged longitudinally in said barrel means;
   at least one of said barrel means and core means being rotatable; and
   a succession of at least two spaced apart discontinuous helical flight means arranged on said core means to form channels between each flight means;
   one flight means being centered in the channel of the preceding flight means;

said flight means being formed by lands having a running length of the narrowest-width-channel between said lands within the range from about −0.25 to about three diameters of the core means, the diameter of the core means including the flight means.

7. An extruder in accordance with claim 6 in which the core means is formed by at least two interconnected abutting sections.

8. An extruder in accordance with claim 6 in which the lands have a total axial length within the range of about 1/10 to about five diameters of the core means, the diameter of the core means including the flight.

9. An extruder in accordance with claim 6 in which the perpendicular width of the narrowest-width-channel is within the range from about 1/20 to about two diameters of the core means, the diameter of the core means including the flights.

10. An extruder in accordance with claim 6 in which:
1. the core means is formed by at least two interconnected abutting sections;
2. the flights are formed by flights each having an axial length within the range from about 1/10 to about five diameters of the core means;
3. the perpendicular width of the narrowest-width-channel is within the range from about 1/20 to about two diameters of the core means.

11. A mixing screw adapted for use in the barrel of a single screw extruder, comprising:
at least first and second interconnected successive elements, each element having:
  1. a rotatable core having leading and trailing ends; and
  2. at least two flights having leading and trailing ends and extending helically in the same direction around said core from said trailing end to said leading end of said core,
said trailing ends of the flights of said second element being transversely displaced in the same direction on said core from the leading ends of the flights of the first element so that the trailing end of each flight of the second element is centered between projected helical planes extending from leading ends of the flights of the first element in order to stream split.

12. The mixing screw of claim 11 in which the flights on successive elements extend around the core in the same helical direction.

13. The mixing screw of claim 11 in which the flights on each of at least two successive elements extend around the core in opposite helical directions.

14. A mixing screw adapted and arranged for stream splitting for use in the barrel of a single screw extruder, comprising:
at least first and second interconnected successive elements, each element having:
  1. a rotatable core having leading and trailing ends, and
  2. at least one flight having leading and trailing ends and extending helically around said core from said trailing end to said leading end of said core,
said one flight having advancing and following walls along its length, said one flight defining a helical channel above said core between its advancing and following walls, said trailing end of said one flight of said second element being transversely displaced on said core from the leading edges of said one flight of the first element so that the trailing end of said one flight of the second element is centrally disposed in the projected helical planes of said channel extending from said first element.

* * * * *